(12) United States Patent
Lehman et al.

(10) Patent No.: US 9,315,124 B2
(45) Date of Patent: Apr. 19, 2016

(54) CHILD RESTRAINT HAVING INDICATOR DEVICE

(71) Applicant: DOREL JUVENILE (ZHONGSHAN) PRODUCT CO., LTD., Zhong Shan (CN)

(72) Inventors: David Andrew Lehman, Lancaster, PA (US); Scott Anderson, East Earl, PA (US)

(73) Assignee: DOREL JUVENILE (ZHONGSHAN) PRODUCT CO., LTD., Zhong Shan, Guang Dong (CN)

( * ) Notice: Subject to any disclaimer, the term of this patent is extended or adjusted under 35 U.S.C. 154(b) by 0 days.

(21) Appl. No.: 14/223,835

(22) Filed: Mar. 24, 2014

(65) Prior Publication Data

US 2014/0300155 A1    Oct. 9, 2014

(30) Foreign Application Priority Data

Apr. 3, 2013    (CN) .......................... 2013 1 0114822
Apr. 3, 2013    (CN) ...................... 2013 2 0163911 U
Feb. 11, 2014   (CN) .......................... 2014 1 0047474
Feb. 11, 2014   (CN) ...................... 2014 2 0061733 U

(51) Int. Cl.
   *A47C 1/08*       (2006.01)
   *B60N 2/28*       (2006.01)

(52) U.S. Cl.
   CPC ............ *B60N 2/2821* (2013.01); *B60N 2/2806* (2013.01)

(58) Field of Classification Search
   CPC .... B60N 2/2821; B60N 2/286; B60N 2/2806; B60N 2/2863

USPC .......................................... 297/250.1, 256.16
   See application file for complete search history.

(56) References Cited

U.S. PATENT DOCUMENTS

| | | | | |
|---|---|---|---|---|
| 6,017,088 | A * | 1/2000 | Stephens et al. | 297/256.16 |
| 6,139,101 | A * | 10/2000 | Berringer et al. | 297/256.1 |
| 6,170,911 | B1 * | 1/2001 | Kassai et al. | 297/250.1 |
| 6,318,799 | B1 * | 11/2001 | Greger et al. | 297/256.13 |
| 6,347,832 | B2 * | 2/2002 | Mori | 297/256.13 |
| 6,863,286 | B2 * | 3/2005 | Eros et al. | 280/47.38 |
| 7,207,628 | B2 * | 4/2007 | Eros | 297/297 |
| 7,887,128 | B2 * | 2/2011 | Zink et al. | 297/256.13 |
| 8,070,226 | B2 * | 12/2011 | Dingler et al. | 297/256.11 |
| 2004/0245822 | A1 * | 12/2004 | Balensiefer et al. | 297/250.1 |
| 2013/0026804 | A1 * | 1/2013 | Guo | 297/250.1 |
| 2014/0265488 | A1 * | 9/2014 | Heisey et al. | 297/256.13 |
| 2015/0048660 | A1 * | 2/2015 | Hou et al. | 297/256.16 |

* cited by examiner

*Primary Examiner* — Laurie K Cranmer
(74) *Attorney, Agent, or Firm* — Locke Lord LLP; Tim Tingkang Xia, Esq.

(57) ABSTRACT

In one aspect, a child restraint includes: a safety seat having a base body positioned on a vehicle seat by a securing device; a foot coupled to a bottom of the base body; a first resilient member disposed between the base body and the foot to maintain a compressible distance between the foot and the base body; and an indicator device disposed on the base body and located above the foot. In one embodiment, a linkage assembly is movably mounted on the base body. When the safety seat is not secured by the securing device, the indicator device is not in contact with the foot, and the indicator device displays a first signal. When the safety seat is secured by the securing device, the base body is compressed toward the foot to trigger the indicator device, such that the indicator device displays a second signal.

15 Claims, 10 Drawing Sheets

CHILD RESTRAINT HAVING INDICATOR DEVICE

CROSS-REFERENCE TO RELATED PATENT APPLICATIONS

This application claims priority to and the benefit of, pursuant to 35 U.S.C. §119(a), Chinese patent application Nos. CN201310114822.8, and CN201320163911.7, filed Apr. 3, 2013, and Chinese patent application Nos. CN201420061733.1, and CN201410047474.1, filed Feb. 11, 2014, in the State Intellectual Property Office of P.R. China, the disclosures of which are incorporated herein in their entireties by reference.

Some references, if any, which may include patents, patent applications and various publications, may be cited and discussed in the description of this invention. The citation and/or discussion of such references, if any, is provided merely to clarify the description of the present invention and is not an admission that any such reference is "prior art" to the invention described herein. All references listed, cited and/or discussed in this specification are incorporated herein by reference in their entireties and to the same extent as if each reference was individually incorporated by reference.

FIELD OF THE INVENTION

This invention relates generally to a child restraint, and particularly to a child restraint having an indicator device which displays signals corresponding to the restraining tension forces applied to the child restraint.

BACKGROUND OF THE INVENTION

Child restraints (CR), sometimes referred to as child safety seats or infant safety seats, are seats designed specifically to protect child passengers of automobile vehicles from injury or death during collisions of the vehicles. Generally, the CR can be installed or fixed into a vehicle seat of the vehicle by means of vehicle seat belts or a lower anchors and tethers for children (LATCH) system. However, because of wide variables of vehicle seats and the CR, it is often difficult to get a secure attachment of the CR to the vehicle. If the CR is not effectively and properly installed into the vehicle, a child sitting in the CR may be exposed to unforeseen risks of injury or death if the CR detaches from the vehicle seat due to the collision impact force. Therefore, CR users are often frustrated by not knowing if they have safely installed the CR to the vehicle. Thus, there is a need for a device showing or displaying the attachment of the CR to the vehicle.

Therefore, a heretofore unaddressed need exists in the art to address the aforementioned deficiencies and inadequacies.

SUMMARY OF THE INVENTION

In one aspect, the present invention relates to a child restraint. In certain embodiments, the child restraint includes: a safety seat; a base body configured to be positioned on a vehicle seat by a securing device, wherein the base body includes an upper shell coupling with the safety seat; a foot coupled to a bottom of the base body; a first resilient member disposed between the base body and the foot to maintain a compressible distance between the foot and the base body; and an indicator device disposed on the base body and located above the foot, configured to display a first signal and a second signal. When the safety seat is not secured by the securing device, the indicator device is not triggered by the foot, and the indicator device displays the first signal. When the safety seat is secured by the securing device, the base body is compressed toward the foot to trigger the indicator device, such that the indicator device displays the second signal.

In certain embodiments, the foot is pivotally coupled to the bottom of the base body.

In certain embodiments, the base body and the safety seat are integrally formed. In certain embodiments, the base body and the safety seat are separately formed components assembled together by a connecting structure.

In certain embodiments, the securing device is a safety belt or a lower anchors and tethers for children (LATCH) system.

In certain embodiments, the child restraint further includes a linkage assembly positioned between the base body and the foot. When the safety seat is secured by the securing device, the foot triggers the indicator device by the linkage assembly such that the indicator device displays the second signal.

In certain embodiments, the safety seat is secured by the securing device to compress the base body toward the foot, such that the indicator device is triggered by the linkage assembly by being in contact with the linkage assembly.

In certain embodiments, the linkage assembly is positioned between the indicator device and the foot, and wherein the linkage assembly comprises connecting link and a driving link, such that the foot triggers the indicator device by the connecting link and the driving link.

In certain embodiments, the child restraint further includes: a connecting arm connected between the linkage assembly and the foot such that a lower end of the linkage assembly retains a first constant distance from the foot; and a releasing member mounted on the base body and operably connected to the connecting arm, configured to drive the connecting arm to disengage from the foot such that the lower end of the linkage assembly retains a second constant distance from the foot, wherein the second constant distance is different from the first constant distance.

In certain embodiments, the foot has a plurality of locking portions, and the connecting arm has a lower end and an upper end, wherein the lower end of the connecting arm is configured to engage with one of the locking portions to lock a variable angle between the base body and the foot, and the upper end of the connecting arm is connected to the releasing member such that the connecting arm is configured to be driven by the releasing member to disengage from the one of the locking portions.

In certain embodiments, the releasing member is configured to operate the connecting arm via a connecting member.

In certain embodiments, the lower end of the connecting arm is connected to at least one pin to engage with the one of the locking portions; and the connecting arm is pivotally coupled to the linkage assembly to be movable relative to the base body.

In certain embodiments, the child restraint further includes a second resilient member connected between the connecting arm and the base body, such that the lower end of the connecting arm maintains engaging with the one of the locking portions.

In certain embodiments, the child restraint further includes a third resilient member connected between the foot and the upper shell to maintain the foot away from the upper shell.

In certain embodiments, the safety seat is secured by the securing device to compress the base body toward the foot, such that the indicator device is triggered by the foot by being in contact with the foot.

In certain embodiments, the base body further includes a clamping mechanism configured to clamp with the securing device.

In certain embodiments, the clamping mechanism includes: a pressing unit pivotally connected to the upper shell of the base body, wherein the pressing unit and the upper shell are configured to clamp with the securing device when the pressing unit and the upper shell are in a closed state; and a spring-biased button engaged with the pressing unit and pivotally connected to the upper shell of the base body, wherein the spring-biased button, in a normal position, is configured to retain the pressing unit and the upper shell in the closed state, and wherein when the spring-biased button is pressed to a biased position, the spring-biased button is configured to release the pressing unit from the upper shell.

In certain embodiments, the indicator device includes: a window connected to the upper shell; a first indicator member configured to show a first color as the first signal through the window; a second indicator member configured to show a second color as the second signal through the window; and a fourth resilient member maintaining the first indicator member to correspond to the window to show only the first signal through the window. When the safety seat is secured by the securing device, the base body is compressed toward the foot, such that the foot drives the second indicator member of the indicator device to correspond to the window to show the second signal through the window.

In certain embodiments, the indicator device includes: a first display device configured to display the first signal; a second display device configured to display the second signal; a power supply configured to supply power to one of the first display device and the second display device, wherein the power supply is configured to supply power to the first display device in a first power state and to supply power to the second display device in a second power state; and a touch switch configured to switch the power supply between the first power state and the second power state. When the indicator device is not triggered by the foot, the power supply is in the first power state, and the first display device displays the first signal. When the safety seat is secured by the securing device to compress the base body toward the foot, the foot is in contact with the touch switch to switch the power supply to the second power state, such that the second display device displays the second signal.

In certain embodiments, the first display device includes a first light emitting diode (LED) configured to emit light in a first color as the first signal; and the second display device includes a second LED configured to emit light in a second color as the second signal.

These and other aspects of the present invention will become apparent from the following description of the preferred embodiment taken in conjunction with the following drawings, although variations and modifications therein may be affected without departing from the spirit and scope of the novel concepts of the disclosure.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment. The following figures are presented for the purpose of illustration only, and are not intended to be limiting.

DETAILED DESCRIPTION OF THE INVENTION

Figure 1:
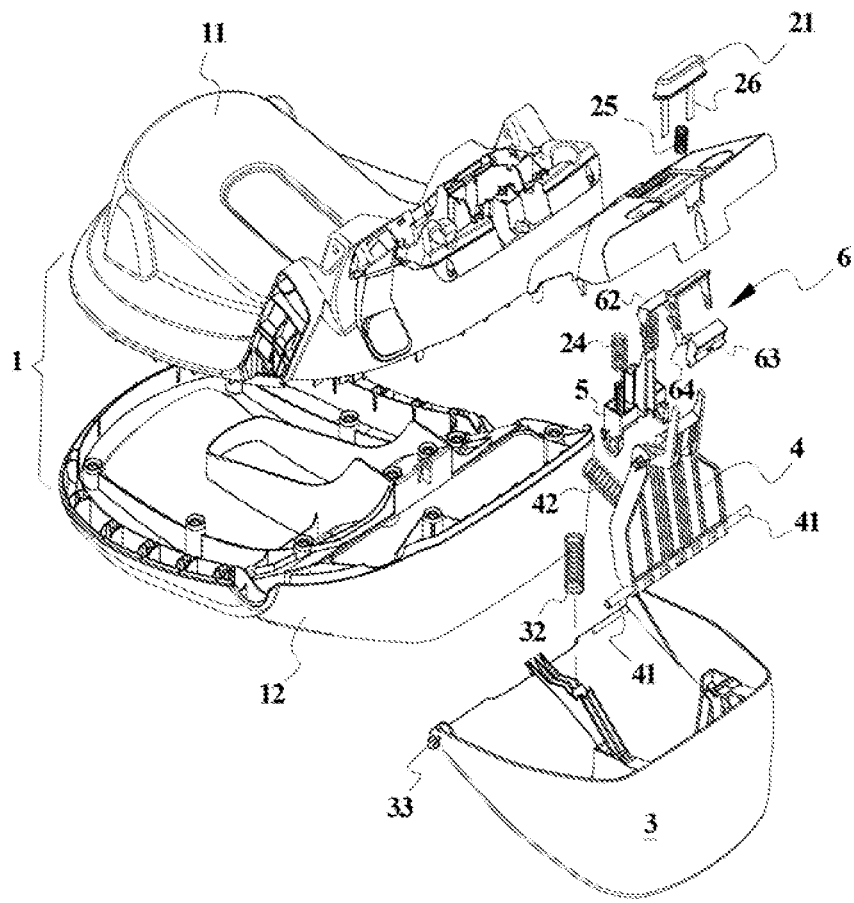
FIG. 1 schematically shows a perspective exploded view of a child restraint having an indicator system according to certain embodiments of the present invention.

The present invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Referring to the drawings, like numbers indicate like components throughout the views.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner in describing the apparatus and methods of the invention and how to make and use them. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and in no way limits the scope and meaning of the invention or of any exemplified term. Likewise, the invention is not limited to various embodiments given in this specification. Furthermore, subtitles may be used to help a reader of the specification to read through the specification, which the usage of subtitles, however, has no influence on the scope of the invention.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, the phrase "at least one of A, B, and C" should be construed to mean a logical (A or B or C), using a non-exclusive logical OR. It should be understood that one or more steps within a method may be executed in different order (or concurrently) without altering the principles of the present disclosure.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, the terms "comprising," "including," "having," "containing," "involving," and the like are to be understood to be open-ended, i.e., to mean including but not limited to.

FIG. 1 schematically shows a perspective exploded view of a child restraint having an indicator system according to certain embodiments of the present invention. As shown in FIG. 1, the child restraint includes a safety seat (not shown) having a base body 1, a foot 3, a connecting arm 4, a linkage assembly 5, a first resilient member 24 and an indicator device 6. In the disclosure, the first resilient member 24 is also called as the resilient member 24. The safety seat may be any seat designed specifically to protect child passengers of automobile vehicles.

As shown in FIG. 1, the base body 1 has an upper shell 11 and a lower shell 12. The upper shell 11 has a shape to be coupling with the safety seat (not shown). In certain embodiments, the upper shell 11 of the base body 1 may be detachable from the safety seat. In certain embodiments, the base body 1 may be integrally formed and not detachable from the safety seat. The lower shell 12 may be connected to the bottom of the upper shell 11, and the bottom of the lower shell 12 is configured to be positioned on a vehicle seat 13 to support the safety seat.

Figure 2:
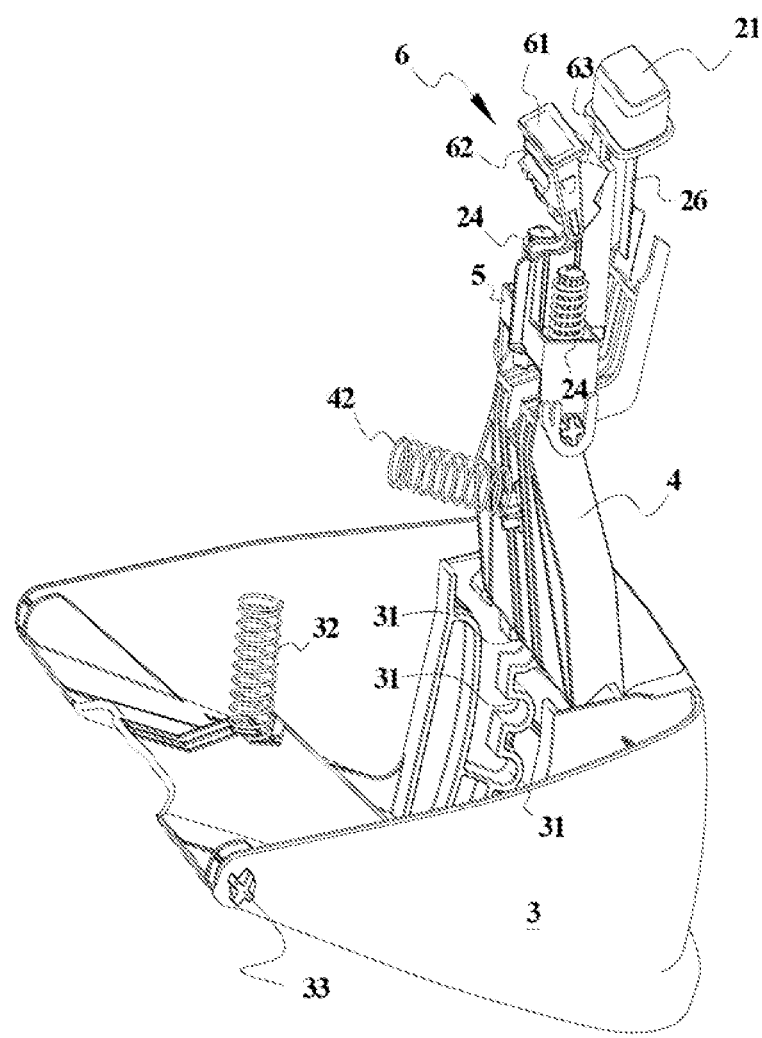
FIG. 2 schematically shows a perspective view of the indicator system of FIG. 1 without the base body according to certain embodiments of the present invention.

The foot 3 is pivotally coupled to a bottom of the base body 1. As shown in FIG. 1, the foot 3 has a pair of pivots 33 pivotally coupled to the lower shell 12 of the base body 1. FIG. 2 schematically shows a perspective view of the indicator system of FIG. 1 without the base body 1 according to certain embodiments of the present invention. As shown in FIG. 2, the foot 3 has a plurality of locking portions 31. Each of the locking portions 31 may have an engaging shape to engage with the connecting arm 4.

In certain embodiments, the foot 3 may be coupled to the bottom of the base body 1 using non-pivotal alternative connections to replace the pivots 33. For example, the pivots 33 may be replaced by hinges, ball and socket joints, cylindrical joints, spherical joints or planar joints, or any other linkage joints that allow the base body 1 to move relative to the foot 3.

Figure 3:
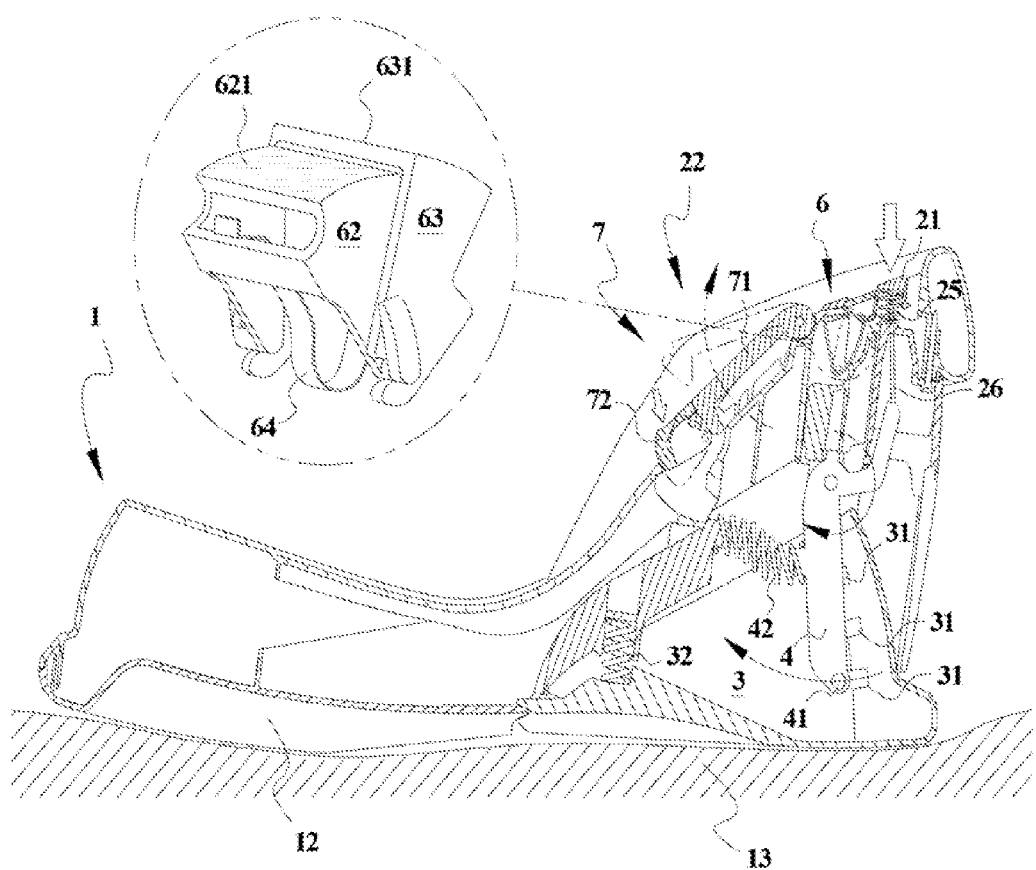
FIG. 3 schematically shows operation of the releasing member of the indicator system of FIG. 1 in a non-restraining state according to certain embodiments of the present invention.

In certain embodiments, the base body 1 may have a releasing member 21 and a passage region 22 for a securing device 23 to pass through. FIG. 3 schematically shows operation of the releasing member 21 of the indicator system of FIG. 1 in a non-restraining state according to certain embodiments of the present invention. As shown in FIG. 3, the base body 1 has a releasing member 21. The releasing member 21 is a member mounted on the base body 1 and operably connected to the connecting arm 4. When a user presses the releasing member 21, the releasing member 21 operably drives the lower end of the connecting arm 4 to disengage from one of the locking portions 31 of the foot 3.

In certain embodiments, a resilient member 25 may be disposed between the releasing member 21 and the base body 1. In certain embodiments, the resilient member 25 may be a spring member. When the releasing member 21 is pressed for operation, the resilient member 25 provides an elastic force to push the releasing member 21 towards its original position.

Figure 4:
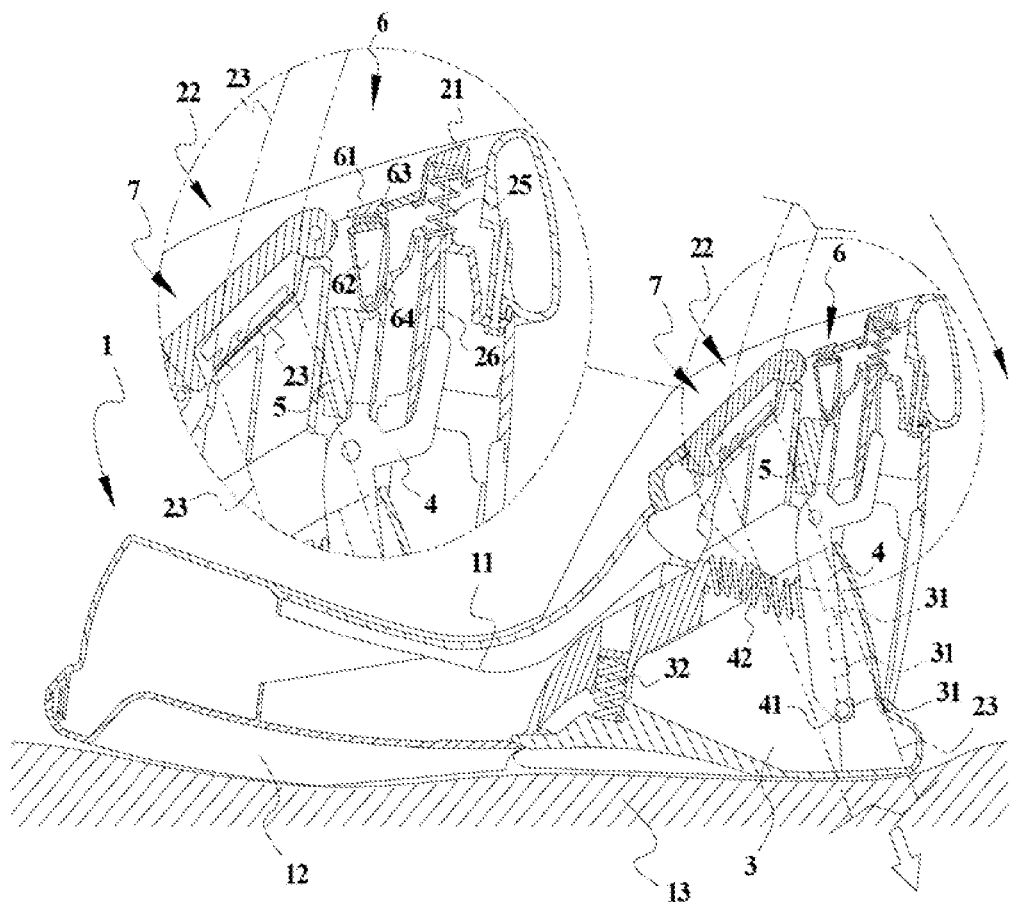
FIG. 4 schematically shows the indicator system of FIG. 1 in a restraining state according to certain embodiments of the present invention.

FIG. 4 schematically shows the indicator system of FIG. 1 in a restraining state according to certain embodiments of the present invention. As shown in FIG. 4, the base body 1 has a passage region 22, which is a region for a securing device 23 to pass through. The securing device 23 passes through the passage region 22 to secure the base body 1 to the vehicle seat 13. In certain embodiments, the securing device 23 may be a safety belt, a LATCH system or any other fastening or securing mechanism to secure the base body 1 to the vehicle seat 13.

In certain embodiments, a clamping mechanism 7 may be provided in the passage region 22 to clamp with the securing device 23 when the securing device 23 secures the base body 1 to the vehicle seat 13. When the vehicle in a driving state turns to the left or the right, the clamping of the clamping mechanism 7 with the securing device 23 may restrict the base body 1 from moving or sliding toward an opposite side direction of the vehicle due to the centrifugal force generated when the vehicle turns.

Referring back to FIG. 3, the clamping mechanism 7 may include a pressing unit 71 and a spring-biased button 72. The pressing unit 71 is pivotally connected to the upper shell 11 of the base body 1. When the pressing unit 71 moves pivotally toward the upper shell 11 such that the pressing unit 71 and the upper shell 11 are in a closed state, the pressing unit 71 and the upper shell 11 may clamp with the securing device 23. The spring-biased button 72 is engaged with the pressing unit 71 and pivotally connected to the upper shell 11 of the base body 1. When the spring-biased button 72 is in a normal position, the spring-biased button 72 retains the pressing unit 71 and the upper shell 11 in the closed state to clamp with the securing device 23. When the spring-biased button 72 is pressed to a biased position, the spring-biased button 72 releases the pressing unit 71 from the upper shell 11 such that the clamping mechanism 7 is released from the securing device 23.

In certain embodiments, a third resilient member 32 may be disposed between the foot 3 and the upper shell 11 of the base body 1 to maintain the foot 3 away from the upper shell 11. In this case, a user may holds the base body 1 to move upwards or downwards at ease without the need to move the foot 3 with hands, and the foot 3 maintains abutting with the vehicle seat 13 due to the elastic force generated by the third resilient member 32. In certain embodiments, the third resilient member 32 may be a spring member. In the disclosure, the third resilient member 32 is also called as the resilient element 32.

The connecting arm 4 has a lower end and an upper end. The upper end of the connecting arm 4 is connected to the releasing member 21 such that the connecting arm 4 is configured to be driven by the releasing member 21, and the lower end of the connecting arm 4 may selectively engage or disengage with one of the locking portions 31 of the foot 3 to lock a variable angle between the base body 1 and the foot 3. When the releasing member 21 drives the connecting arm 4 to disengage from the one of the locking portions 31, the connecting arm 4 may move to adjust the variable angle between the base body 1 and the foot 3, and the lower end of the connecting arm 4 may selectively engage with another locking portion 31 to fix the variable angle.

In certain embodiments, the lower end of the connecting arm 4 is connected to at least one pin 41 (for example, one pin 41 or a pair of pins 41) to engage with the one of the locking portions 31. In certain embodiments, a second resilient member 42 is provided between the connecting arm 4 and the base body 1, such that the pin 41 at the lower end of the connecting arm 4 maintains engaging with the one of the locking portions 31 due to the elastic force generated by the second resilient member 42. In certain embodiments, the second resilient member 42 may be a spring member. In the disclosure, the second resilient member 42 is also called as the resilient part 42.

As shown in FIG. 3, the releasing member 21 is connected to the connecting arm 4 via a connecting member 26. When the user presses the releasing member 21, the releasing member 21 drives the connecting member 26 to push the upper end of the connecting arm 4 such that the lower end of the connecting arm 4 disengages from one of the locking portions 31 of the foot 3. In certain embodiments, the connecting arm 4 and the releasing member 21 may be directly coupled together such that the releasing member 21 may directly drive the upper end of the connecting arm 4.

The upper shell 11 of the base body 1 has a through hole connecting the indicator device 6 and the foot 3. The linkage assembly 5 is provided in the hole to be movable along the direction of the hole. An upper end of the linkage assembly 5 is connected to the first resilient member 24, and a lower end of the linkage assembly 5 retains a constant distance from the foot 3. Specifically, the lower end of the linkage assembly 5 is abutted with or connected to the connecting arm 4 in order to retain the constant distance from the foot 3. As long as the lower end of the connecting arm 4 is engaged to one of the locking portions 31 of the foot 3, the first resilient member 24 generates an elastic force to push the base body 1 upwards such that the upper end of the linkage assembly 5 maintains a compressible distance from the upper shell 11 of the base body 1. When the first resilient member 24 is compressed, the upper end of the linkage assembly 5 abuts with a lower end of the indicator device 6. In certain embodiments, the first resilient member 24 may be a spring member.

Figure 5:
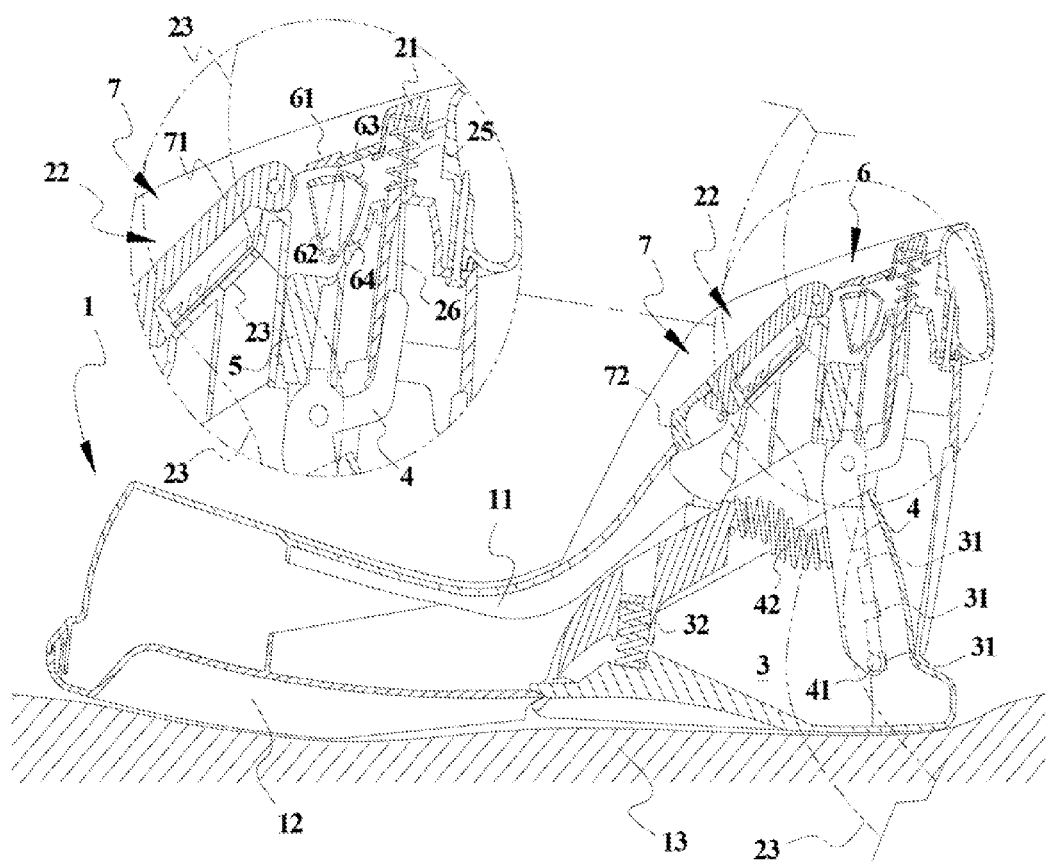
FIG. 5 schematically shows the indicator system of FIG. 1 in a non-restraining state according to certain embodiments of the present invention.
Figure 6:
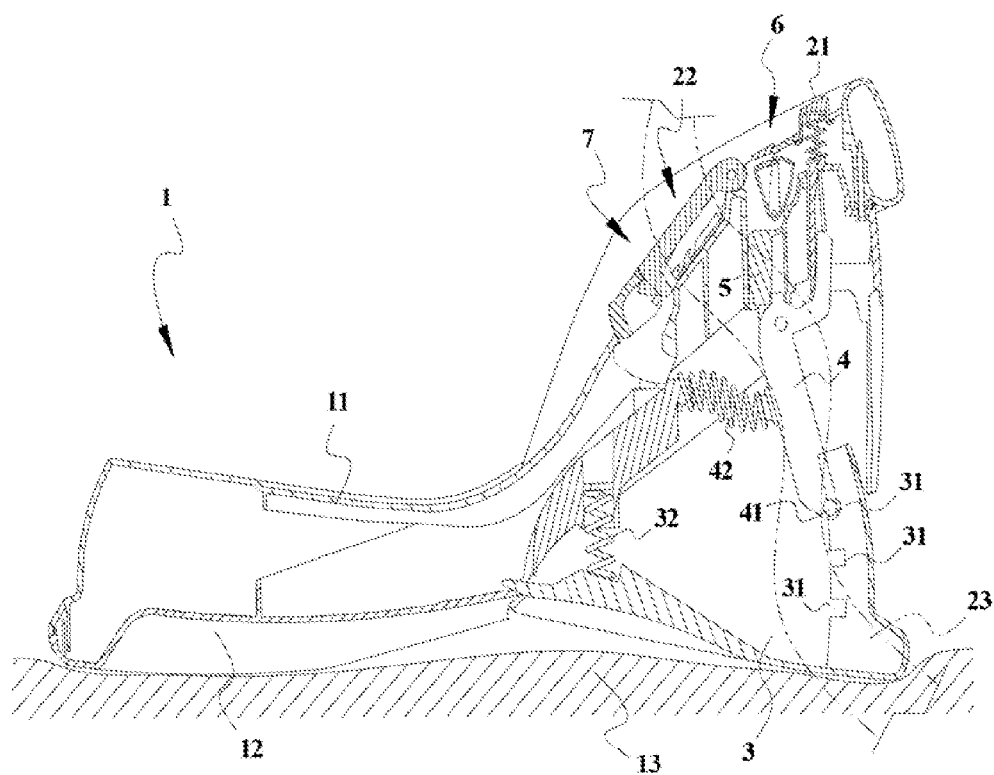
FIG. 6 schematically shows an indicator system of a child restraint in a non-restraining state according to certain embodiments of the present invention.
Figure 7:
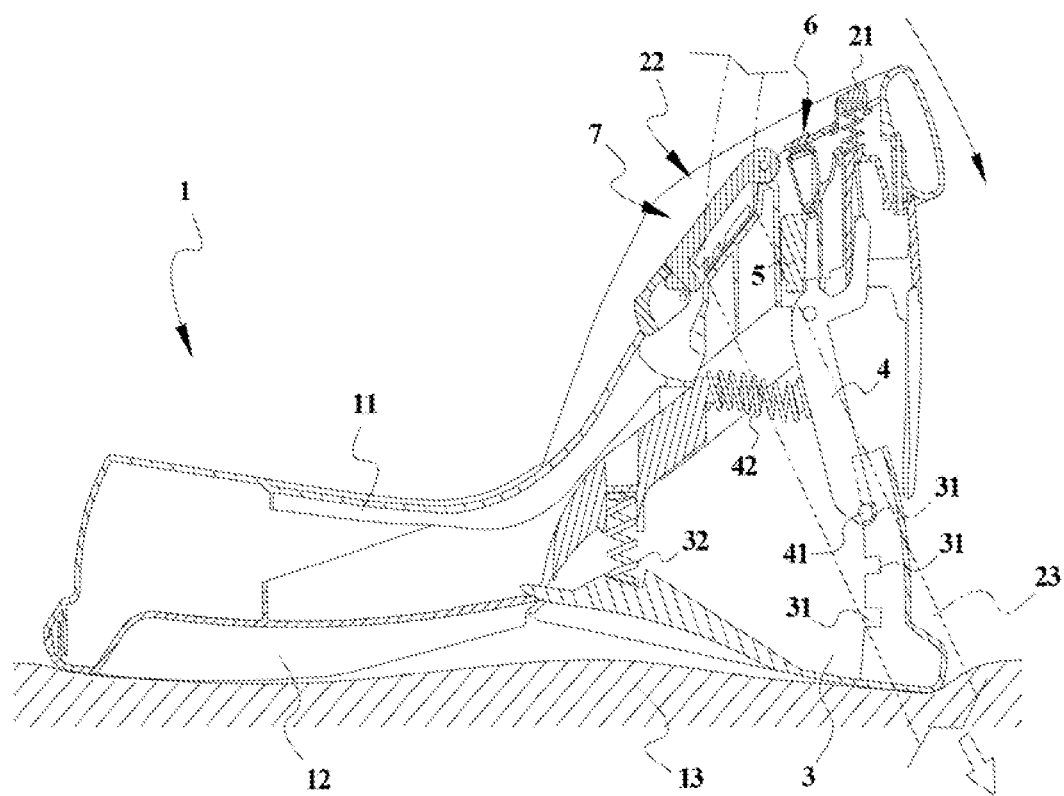
FIG. 7 schematically shows the indicator system of FIG. 6 in a restraining state according to certain embodiments of the present invention.

It should be appreciated that the constant distance between the lower end of the linkage assembly 5 and the foot 3 is related to the engaging position of the lower end of the connecting arm 4 to one of the locking portions 31 of the foot 3. FIG. 5 schematically shows the indicator system of FIG. 1 in a non-restraining state according to certain embodiments of the present invention, FIG. 6 schematically shows an indicator system of a child restraint in a non-restraining state according to certain embodiments of the present invention, and FIG. 7 schematically shows the indicator system of FIG. 6 in a restraining state according to certain embodiments of the present invention. The difference between the indicator system as shown in FIG. 5 and that as shown in FIG. 6 is the engaging position of the lower end of the connecting arm 4 to one of the locking portions 31 of the foot 3. Similarly, the difference between the indicator system as shown in FIG. 4 and that as shown in FIG. 7 is the engaging position of the lower end of the connecting arm 4 to one of the locking portions 31 of the foot 3. Specifically, when the lower end of the connecting arm 4 is engaged to one of the locking portions 31 of the foot 3, the lower end of the linkage assembly 5 retains a first constant distance from the foot 3. When the releasing member 21 drives the connecting arm 4 to disengage from the one of the locking portions 31 of the foot 3 and engage to a different locking portion 31 of the foot 3, as shown in FIG. 6, the lower end of the linkage assembly 5 may retain a second constant distance from the foot 3, and the second constant distance is different from the first constant distance.

Referring back to FIG. 2, the linkage assembly 5 is pivotally coupled to the connecting arm 4 to move together back and forth within the base body 1. In certain embodiments, the linkage assembly 5 may be integrally formed with the connecting arm 4 as one single part. In certain embodiments, for example, the connecting arm 4 may be omitted, and the linkage assembly 5 may be elongated such that the lower end of the linkage assembly 5 directly abuts with the foot 3 without using the connecting arm 4. In certain embodiments, the linkage assembly 5 may be omitted, and the connecting arm 4 may be elongated upwards to serve as a linkage portion such that when the first resilient member 24 is compressed, the elongated linkage portion of the connecting arm 4 abuts with a lower end of the indicator device 6.

The indicator device 6 is disposed on the base body 1 and located above the linkage assembly 5. As shown in FIG. 5, when the safety seat is not secured by the securing device 23, the indicator device 6 is not in contact with the linkage assembly 5, and the indicator device 6 displays a first signal showing that the child restraint is not secured by the securing device 23. Referring back to FIG. 4, when the safety seat is secured by the securing device 23, the securing device 23 compresses the base body 1 toward the foot 3 such that the lower end of the indicator device 6 is in contact with the linkage assembly 5, and the indicator device 6 is driven by the linkage assembly 5 to display a second signal showing that the child restraint is secured by the securing device 23.

In certain embodiments, the indicator device 6 may include a window 61, a first indicator member 62, and a second indicator member 63. The window 61 is fixed on the upper shell 11 of the base body 1 such that one of the first indicator member 62 and the second indicator member 63 may display a signal through the window 61. The first indicator member 62 is configured to show a first color 621 as the first signal through the window 61, and the second indicator member 63 is configured to show a second color 631 as the second signal through the window 61. When the safety seat is not secured by the securing device 23, the first indicator member 62 corresponds to the window 61 to show the first signal through the window 61. When the safety seat is secured by the securing device 23 to compress the base body 1 toward the linkage assembly 5, the indicator device 6 moves downwards with the base body 1 such that a pressing portion of the second indicator member 63 contacts the linkage assembly 5. By the contact between the linkage assembly 5 and the pressing portion of the second indicator member 63, the second indicator member 63 corresponds to the window 61 to show the second signal through the window 61. In certain embodiments, the pressing portion is a part of the second indicator member 63 or an additional member disposed on the second indicator member 63.

In certain embodiment, a fourth resilient member 64 may be provided between the first indicator member 62 and the second indicator member 63 to maintain the first indicator member 62 to correspond to the window 61 and the second indicator member 63 to be away from the window 61. Thus, the indicator device 6 may show only the first signal through the window 61 when the safety seat is not secured by the securing device 23. When the safety seat is secured by the securing device 23, the fourth resilient member 64 is compressed such that the second indicator member 63 moves to correspond to the window 61 to show the second signal through the window 61. In certain embodiments, the fourth resilient member 64 may be a spring member. In the disclosure, the fourth resilient member 64 is also called as the resilient component 64.

In certain embodiments, in a typical sequence of color phases widely adopted by human beings, the first color 621 may be red to represent the non-restraining state of the securing device 23, and the second color 631 may be green to represent the restraining state of the securing device 23.

It should be appreciated that, instead of using the first color 621 and the second color 631, the first indicator member 62 and the second indicator member 63 may use symbols, words or other representative marks to represent the first signal and the second signal.

It should be appreciated that the purpose of using the linkage assembly 5 to contact with the indicator device 6 is to trigger the indicator device 6 to switch from the first signal to the second signal. In other words, the indicator device 6 is triggered by the linkage assembly 5 with the contacting force provided by the linkage assembly 5.

In certain embodiments, the linkage assembly 5 further includes a connecting link 51 and a driving link 68. The linkage assembly 5 is positioned between the indicator device 6 and the foot 3, such that the foot 3 may trigger the indicator device 6 by the connecting link 51 and the driving link 68 to change the signal displayed.

In one embodiment, for example, the indicator device 6 may be connected to the linkage assembly 5 with a driving link 68, such as a wire or a rod. When the safety seat is secured by the securing device 23 to compress the base body 1 toward the foot 3, the indicator device 6 is triggered by the linkage assembly 5 through a movement of the driving link 68.

Figure 8:
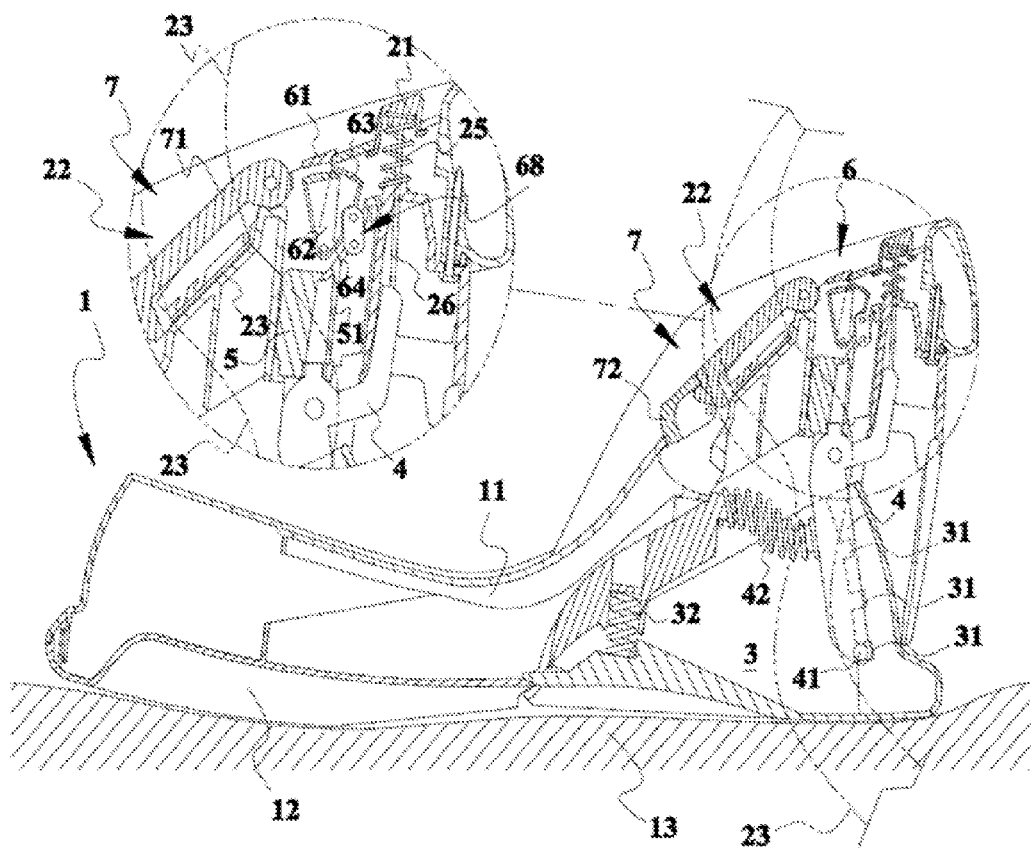
FIG. 8 schematically shows an indicator system of a child restraint in a non-restraining state according to certain embodiments of the present invention.
Figure 9:
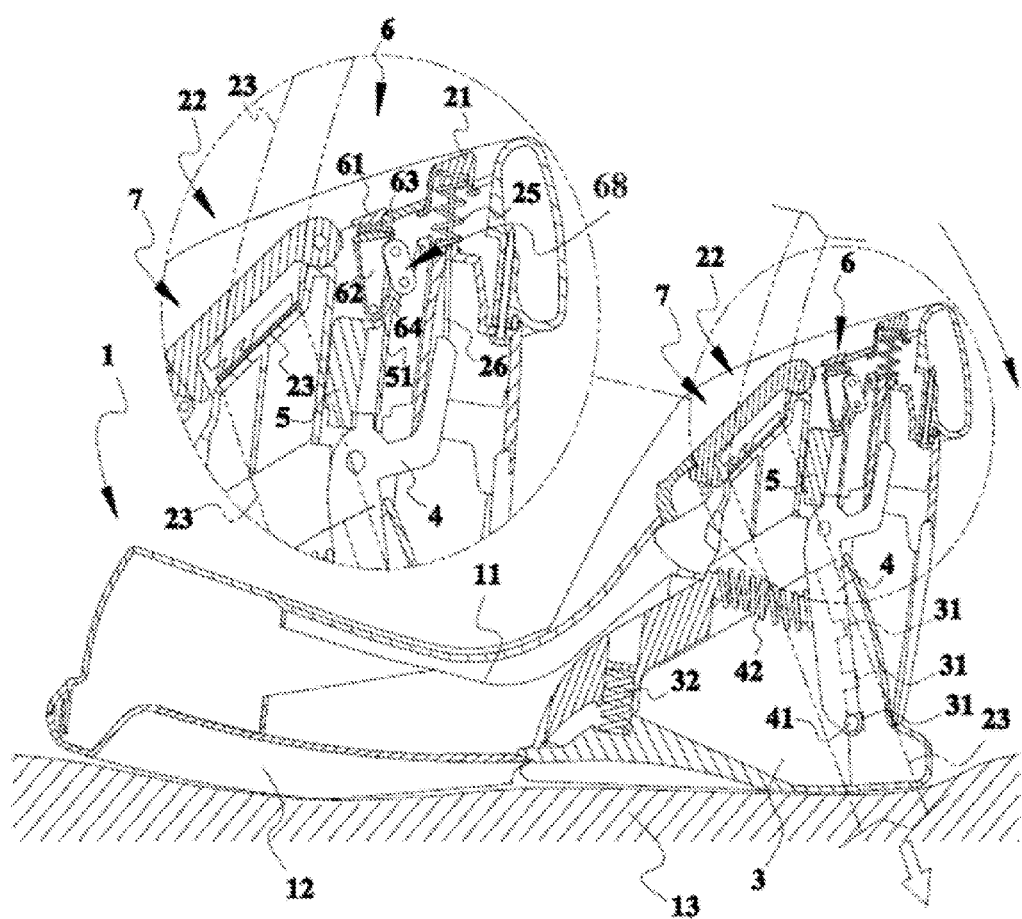
FIG. 9 schematically shows the indicator system of FIG. 8 in a restraining state according to certain embodiments of the present invention.

FIG. 8 schematically shows an indicator system of a child restraint in a non-restraining state according to certain embodiments of the present invention, and FIG. 9 schematically shows the indicator system of FIG. 8 in a restraining state according to certain embodiments of the present invention. The difference between the child restraint as shown in FIG. 8 and the child restraint as shown in FIG. 5 exists in that a driving link 68 is provided in the embodiment as shown in FIG. 8 to connect the linkage assembly 5 with the indicator device 6. FIG. 8 shows that the driving link 68 may be a rod, which is pivotally connected to the linkage assembly 5 and the second indicator member 63 of the indicator device 6. In certain embodiments, the driving link 68 may be a wire or any other linkage structure. When the safety seat is not secured by the securing device 23, as shown in FIG. 8, the first indicator member 62 corresponds to the window 61 to show the first signal through the window 61. When the safety seat is secured by the securing device 23, as shown in FIG. 9, the securing device 23 compresses the base body 1 toward the foot 3, and the indicator device 6 moves downwards with the base body 1 toward the linkage assembly 5. The pivotal movement of the driving link 68 forces the second indicator member 63 of the indicator device 6 to move such that the second indicator member 63 corresponds to the window 61 to show the second signal through the window 61, thus triggering the indicator device 6 to display the second signal.

In certain embodiments, the linkage assembly 5 may be in constant contact with the indicator device 6, and the triggering of the indicator device 6 is performed by the action of the linkage assembly 5. In one embodiment, for example, the upper end of the linkage assembly 5 may be pivotally connected to the indicator device 6, and the lower end of the linkage assembly 5 is distanced away from the connecting arm 4. When the safety seat is secured by the securing device 23, the securing device 23 compresses the base body 1 toward the foot 3, and the lower end of the linkage assembly 5 is in contact with the connecting arm 4. The contact force of the linkage assembly 5 and the connecting arm 4 will thus trigger the indicator device 6 to display the second signal.

Figure 10:
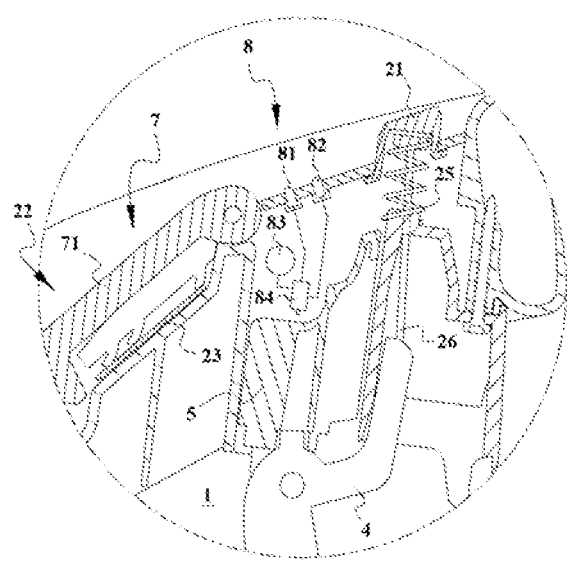
FIG. 10 schematically shows an indicator device according to certain embodiments of the present invention.

In certain embodiments, instead of using the window 61, the indicator device 6 may use other mechanism to indicate the restraining state of the securing device 23. FIG. 10 schematically shows an indicator device according to certain embodiments of the present invention. As shown in FIG. 10, the indicator device 8 includes a first display device 81, a second display device 82, a power supply 83 and a touch switch 84. Both the first display device 81 and the second display device 82 are positioned on the upper shell 11 of the base body 1. The first display device 81 is configured to display the first signal, and the second display device 82 configured to display the second signal. In certain embodiments, the first display device 81 may include a first light emitting diode (LED) configured to emit light in a first color (e.g. the red color) as the first signal; and the second display device 82 may include a second LED configured to emit light in a second color (e.g. the green color) as the second signal.

The power supply 83 may be a battery or an on-vehicle power supply, which is configured to supply power to one of the first display device 81 and the second display device 82. Specifically, the power supply 83 is configured to supply power to the first display device 81 in a first power state and to supply power to the second display device 82 in a second power state. The touch switch 84 configured to switch the power supply 83 between the first power state and the second power state. When the safety seat is not secured by the securing device 23, the indicator device 8 is not in contact with the linkage assembly 5. Thus, the power supply 83 is in the first power state, and the first display device 81 displays the first signal while the second display device 82 is off, showing that the child restraint is not secured by the securing device 23. When the safety seat is secured by the securing device 23 to compress the base body 1 toward the linkage assembly 5, the linkage assembly 5 is in contact with the touch switch 84 to switch the power supply 83 to the second power state. Thus, the first display device 81 is off, and the second display device 82 displays the second signal showing that the child restraint is secured by the securing device 23.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. For example, multiple probes may be utilized at the same time to practice the present invention. Accordingly, the scope of the present invention is defined by the appended claims rather than the foregoing description and the exemplary embodiments described therein.

What is claimed is:

1. A child restraint used in coupling with a safety seat, comprising:
    a base body configured to be positioned on a vehicle seat by a securing device, wherein the base body comprises an upper shell coupling with the safety seat;
    a foot coupled to a bottom of the base body;
    a resilient member disposed between the base body and the foot to maintain a compressible distance between the foot and the base body;
    an indicator device disposed on the base body and located above the foot, configured to display a first signal and a second signal;
    a linkage assembly positioned between the base body and the foot, wherein when the base body is secured by the securing device, the foot triggers the indicator device by the linkage assembly such that the indicator device displays the second signal;
    a connecting arm connected between the linkage assembly and the foot such that a lower end of the linkage assembly retains a first constant distance from the foot; and
    a releasing member mounted on the base body and operably connected to the connecting arm, configured to drive the connecting arm to disengage from the foot such that the lower end of the linkage assembly retains a second constant distance from the foot, wherein the second constant distance is different from the first constant distance;
    wherein when the base body is not secured by the securing device, the indicator device is not triggered by the foot, and displays the first signal; and
    wherein when the base body is secured by the securing device, the base body is compressed toward the foot to trigger the indicator device, such that the indicator device displays the second signal.

2. The child restraint according to claim 1, wherein the foot is pivotally coupled to the bottom of the base body.

3. The child restraint according to claim 1, wherein the base body is secured by the securing device to compress the base body toward the foot, such that the indicator device is triggered by the linkage assembly by being in contact with the linkage assembly.

4. The child restraint according to claim 1, wherein the linkage assembly is positioned between the indicator device and the foot, and wherein the linkage assembly comprises a connecting link and a driving link, such that the foot triggers the indicator device by the connecting link and the driving link.

5. The child restraint according to claim 1, wherein the foot has a plurality of locking portions, and the connecting arm has a lower end and an upper end, wherein the lower end of the connecting arm is configured to engage with one of the locking portions to lock a variable angle between the base body and the foot, and the upper end of the connecting arm is connected to the releasing member such that the connecting arm is configured to be driven by the releasing member to disengage from the one of the locking portions.

6. The child restraint according to claim 5, wherein the releasing member is configured to operate the connecting arm via a connecting member.

7. The child restraint according to claim 5, wherein
    the lower end of the connecting arm is connected to at least one pin to engage with the one of the locking portions; and
    the connecting arm is pivotally coupled to the linkage assembly to be movable relative to the base body.

8. The child restraint according to claim 5, further comprising:
    a resilient part connected between the connecting arm and the base body, such that the lower end of the connecting arm maintains engaging with the one of the locking portions.

9. The child restraint according to claim 1, further comprising:

a resilient element connected between the foot and the upper shell to maintain the foot away from the upper shell.

10. The child restraint according to claim 1, wherein the base body is secured by the securing device to compress the base body toward the foot, such that the indicator device is triggered by being in contact with the foot.

11. The child restraint according to claim 1, wherein the base body further comprises a clamping mechanism configured to clamp with the securing device.

12. The child restraint according to claim 11, wherein the clamping mechanism comprises:
- a pressing unit pivotally connected to the upper shell of the base body, wherein the pressing unit and the upper shell are configured to clamp with the securing device when the pressing unit and the upper shell are in a closed state; and
- a spring-biased button engaged with the pressing unit and pivotally connected to the upper shell of the base body, wherein the spring-biased button, in a normal position, is configured to retain the pressing unit and the upper shell in the closed state, and wherein when the spring-biased button is pressed to a biased position, the spring-biased button is configured to release the pressing unit from the upper shell.

13. A child restraint used in coupling with a safety seat, comprising:
- a base body configured to be positioned on a vehicle seat by a securing device, wherein the base body comprises an upper shell coupling with the safety seat;
- a foot coupled to a bottom of the base body;
- a resilient member disposed between the base body and the foot to maintain a compressible distance between the foot and the base body; and
- an indicator device disposed on the base body and located above the foot, configured to display a first signal when the base body is not secured by the securing device and a second signal when the base body is secured by the securing device, wherein the indicator device comprises:
- a window connected to the upper shell;
- a first indicator member configured to show a first color as the first signal through the window;
- a second indicator member configured to show a second color as the second signal through the window; and
- a resilient component maintaining the first indicator member to correspond to the window to show only the first signal through the window;

wherein when the base body is secured by the securing device, the base body is compressed toward the foot, such that the foot drives the second indicator member of the indicator device to correspond to the window to show the second signal through the window.

14. A child restraint used in coupling with a safety seat, comprising:
- a base body configured to be positioned on a vehicle seat by a securing device, wherein the base body comprises an upper shell coupling with the safety seat;
- a foot coupled to a bottom of the base body;
- a resilient member disposed between the base body and the foot to maintain a compressible distance between the foot and the base body; and
- an indicator device disposed on the base body and located above the foot, configured to display a first signal when the base body is not secured by the securing device and a second signal when the base body is secured by the securing device, wherein the indicator device comprises:
- a first display device configured to display the first signal;
- a second display device configured to display the second signal;
- a power supply configured to supply power to one of the first display device and the second display device, wherein the power supply is configured to supply power to the first display device in a first power state and to supply power to the second display device in a second power state; and
- a touch switch configured to switch the power supply between the first power state and the second power state;

wherein when the indicator device is not triggered, the power supply is in the first power state, and the first display device displays the first signal;

wherein when the base body is secured by the securing device to compress the base body toward the foot, the foot is in contact with the touch switch to switch the power supply to the second power state, such that the second display device displays the second signal.

15. The child restraint according to claim 14, wherein:
the first display device comprises a first light emitting diode (LED) configured to emit light in a first color as the first signal; and
the second display device comprises a second LED configured to emit light in a second color as the second signal.

* * * * *